(12) United States Patent
Shin et al.

(10) Patent No.: US 11,472,418 B2
(45) Date of Patent: Oct. 18, 2022

(54) POWER ASSISTED TOWING MODE CONTROL METHOD AND SYSTEM FOR ECOFRIENDLY VEHICLES

(71) Applicants: HYUNDAI MOTOR COMPANY, Seoul (KR); KIA MOTORS CORPORATION, Seoul (KR)

(72) Inventors: Dong Jun Shin, Hwaseong-si (KR); Kyunghun Hwang, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 300 days.

(21) Appl. No.: 16/460,129

(22) Filed: Jul. 2, 2019

(65) Prior Publication Data

US 2020/0164890 A1 May 28, 2020

(30) Foreign Application Priority Data

Nov. 28, 2018 (KR) ........................ 10-2018-0149389

(51) Int. Cl.
| | | |
|---|---|---|
| *B60L 15/00* | (2006.01) | |
| *B60K 17/00* | (2006.01) | |
| *B62D 63/00* | (2006.01) | |
| *B60L 1/00* | (2006.01) | |
| *B62D 59/00* | (2006.01) | |
| *B60W 40/107* | (2012.01) | |
| *B60W 20/10* | (2016.01) | |
| *B60W 50/038* | (2012.01) | |

(52) U.S. Cl.
CPC .......... *B60W 40/107* (2013.01); *B60W 20/10* (2013.01); *B60W 50/038* (2013.01); *B60W 2300/14* (2013.01); *B60W 2540/103* (2013.01); *B60Y 2300/28* (2013.01)

(58) Field of Classification Search
None
See application file for complete search history.

(56) References Cited

U.S. PATENT DOCUMENTS

| | | | |
|---|---|---|---|
| 8,700,284 B2* | 4/2014 | Wojtkowicz | B60L 7/18 903/907 |
| 2013/0079966 A1* | 3/2013 | Terakawa | B60W 10/06 180/65.265 |
| 2018/0086227 A1* | 3/2018 | Healy | B60L 15/2018 |

FOREIGN PATENT DOCUMENTS

| | | |
|---|---|---|
| JP | 6-219348 A | 8/1994 |
| JP | 2004-141083 A | 5/2004 |
| JP | 3613430 B2 | 1/2005 |

* cited by examiner

*Primary Examiner* — Adam D Tissot
(74) *Attorney, Agent, or Firm* — Slater Matsil, LLP (57) ABSTRACT

Disclosed are a power assisted towing mode control method and system for ecofriendly vehicles. The power assisted towing mode control method is executed to control a power assisted towing mode between a first vehicle as a towing vehicle and a second vehicle as a towed vehicle, and includes determining, by the first vehicle, whether or not an accelerator pedal amount exceeds a threshold value, calculating, by the first vehicle, driver request torque based on the accelerator pedal amount, calculating, by the first vehicle, motor allowable torque based on the driver request torque, receiving, by the second vehicle, the motor allowable torque and calculating motor dischargeable torque based on the motor allowable torque, and performing, by the second vehicle, motor torque output based on the motor dischargeable torque.

20 Claims, 5 Drawing Sheets

POWER ASSISTED TOWING MODE CONTROL METHOD AND SYSTEM FOR ECOFRIENDLY VEHICLES

This application claims the benefit of Korean Patent Application No. 10-2018-0149389, filed on Nov. 28, 2018, which is hereby incorporated by reference as if fully set forth herein.

BACKGROUND

Field

The present disclosure relates to a power assisted towing mode control method and system for ecofriendly vehicles.

Discussion of the Related Art

In general, green vehicles, clean vehicles or ecofriendly vehicles (EV/HEV/PHEV/FCEV) are using electric driving power as a main driving source, and may include a motor, an inverter and an energy storage system (ESS) as main power parts. The inverter may be an important part to control current flowing in the motor, and the ESS may be a main source of electric energy.

When a typical four-wheel-drive vehicle or an all-wheel-drive vehicle is towed, a transmission is located at a neutral position so that no load is applied to a towing vehicle in the event of towing.

SUMMARY

When an ecofriendly vehicle is towed and does not provide torque, the towed vehicle act as only driving load of a towing vehicle. Thus, the driving load of the towing vehicle is the sum of driving resistance of the towing vehicle and driving resistance of the towed vehicle, and a fuel consumption amount of the towing vehicle may increase.

One aspect of the present invention provides a power assisted towing mode control method and system for ecofriendly vehicles.

Another aspect of the present invention provides a power assisted towing mode control method and system for ecofriendly vehicles in which a towed vehicle receives feedback of driver request torque of a towing vehicle, determines whether or not power assistance is possible, calculates assistant power to assist power of the towing vehicle and then outputs the calculated assistant power through a motor of the towed vehicle.

Additional advantages, aspects, and features of the invention will be set forth in part in the description which follows and in part will become apparent to those having ordinary skill in the art upon examination of the following or may be learned from practice of the invention. The aspects and other advantages of the invention may be realized and attained by the structure particularly pointed out in the written description and claims hereof as well as the appended drawings.

A further aspect of the invention provides a power assisted towing mode control method for ecofriendly vehicles to control a power assisted towing mode between a first vehicle as a towing vehicle and a second vehicle as a towed vehicle includes determining, by the first vehicle, whether or not an accelerator pedal amount exceeds a threshold value, calculating, by the first vehicle, driver request torque based on the accelerator pedal amount, calculating, by the first vehicle, motor allowable torque based on the driver request torque, receiving, by the second vehicle, the motor allowable torque and calculating motor dischargeable torque based on the motor allowable torque, and performing, by the second vehicle, motor torque output based on the motor dischargeable torque.

The power assisted towing mode control method may further include determining, by the second vehicle, discharge limit power of an energy storage system, if the accelerator pedal amount exceeds the threshold value.

The calculating the motor dischargeable torque may include setting the motor dischargeable torque to a value within the determined discharge limit power of the energy storage system and the motor allowable torque.

The calculating the motor allowable torque may include assigning a remaining torque value except a minimum engine torque value considering the driver request torque and efficiency of an engine of the first vehicle as the motor allowable torque.

The power assisted towing mode control method may further include calculating, by the first vehicle, engine final output torque based on the motor dischargeable torque received from the second vehicle.

The calculating the engine final output torque may include setting the engine final output torque to a difference value between the driver request torque and the motor dischargeable torque.

The performing the motor torque output may include calculating, by an inverter of the second vehicle, current control according to the motor dischargeable torque, and outputting, by a motor of the second vehicle, torque according to the calculated current control.

The calculating the motor dischargeable torque may include calculating the motor dischargeable torque so that a distance between the first vehicle and the second vehicle remains constant.

The power assisted towing mode control method may further include controlling, by the first vehicle, engine torque output to compensate for a decrement of the motor torque output, if the motor torque output is decreased according to lowering of a state of charge (SOC) of an energy storage system of the second vehicle.

It is to be understood that both the foregoing general description and the following detailed description of the present disclosure are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Reference will now be made in detail to the embodiments of the present invention, examples of which are illustrated in the accompanying drawings. In the following description of the embodiments, it will be understood that the suffixes "module" and "unit" in elements are provided or used interchangeably only in consideration of ease in preparation of the description, and do not have distinct meanings or functions.

In the following description of the embodiments, it will be understood that, when positional relations are expressed, for example, when an element is "on" or "under" or "in front of" or "behind" another element, the two elements may directly contact each other, or one or more other elements may be interposed between the two elements.

In addition, in the following description of elements in the present disclosure, the terms "first", "second", "A", "B", "(a)", "(b)", etc. may be used. It will be understood that these terms are used only to discriminate one element from other elements, and do not limit the nature, sequence or order of the corresponding element. In the following description of the embodiments, it will be understood that, when an element is "connected to", "coupled to" or "combined with" another element, the element may be directly connected or coupled to the other element, or one or more other elements may be interposed between the two elements.

Further, in the following description of the embodiments, the terms "including", "comprising", "having", etc. will be interpreted as indicating the presence of one or more other characteristics, numbers, steps, operations, elements or parts stated in the specification or combinations thereof, and do not exclude presence of characteristics, numbers, steps, operations, elements, parts or combinations thereof, or possibility of adding the same, unless stated otherwise. All terms including technical or scientific terms have the same meanings as generally understood by those skilled in the art in which the present invention pertains, unless defined otherwise. In the following description of the embodiments, generally used terms, such as terms defined in dictionaries, will be interpreted as having meanings coinciding with contextual meanings in the related art, and are not to be interpreted as having ideal or excessively formal meanings, unless defined clearly.

Figure 1:
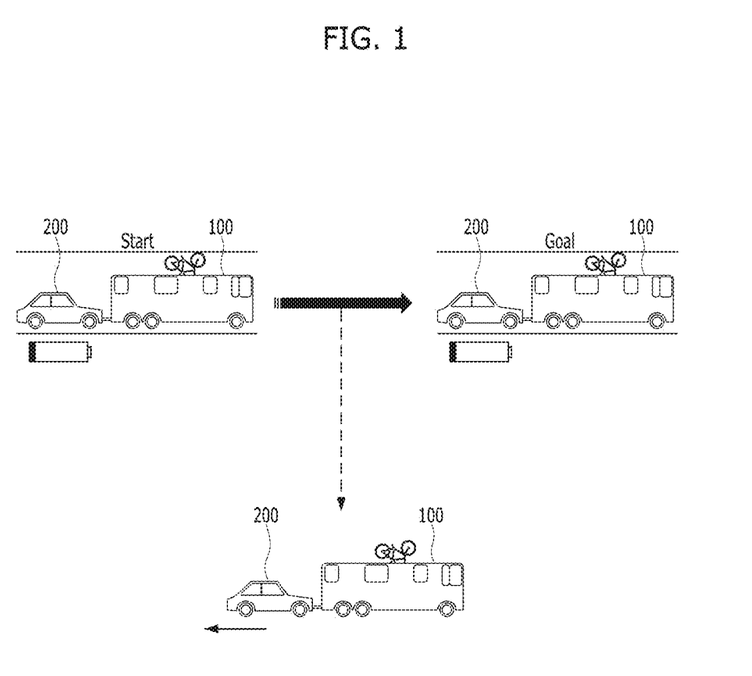
FIG. 1 is a view illustrating an implementation of a towing method for ecofriendly vehicles.

FIG. 1 is a view illustrating an implementation of a towing method for ecofriendly vehicles.

Referring to FIG. 1, if a towed vehicle 200 is an ecofriendly vehicle, when a towing vehicle 100 towing the ecofriendly vehicle 200 is moved from a start point to a goal point or destination location, a function of the ecofriendly vehicle 200 to assist power of the towing vehicle 100 is not operated, and thus, a state of charge (SOC) of the ecofriendly vehicle 200 is maintained.

In the foregoing towing implementation, the towed vehicle act as only driving load of the towing vehicle, and the driving load of the towing vehicle may be the sum of driving resistance of the towing vehicle 100 and driving resistance of the towed vehicle 200. Thus, a fuel consumption amount of the towing vehicle 100 increases.

One embodiment of the present invention may provide a power assisted towing mode control method for ecofriendly vehicles in which, if a towed vehicle is operated in a power assisted towing mode, a towing vehicle calculates motor allowable torque based on driver request torque of the towing vehicle, the towed vehicle calculates motor dischargeable torque based on the motor allowable torque and outputs torque of a motor based on the motor dischargeable torque, and the towing vehicle calculates engine final output torque based on the motor dischargeable torque and then output the engine final output torque as torque of an engine.

Figure 2:
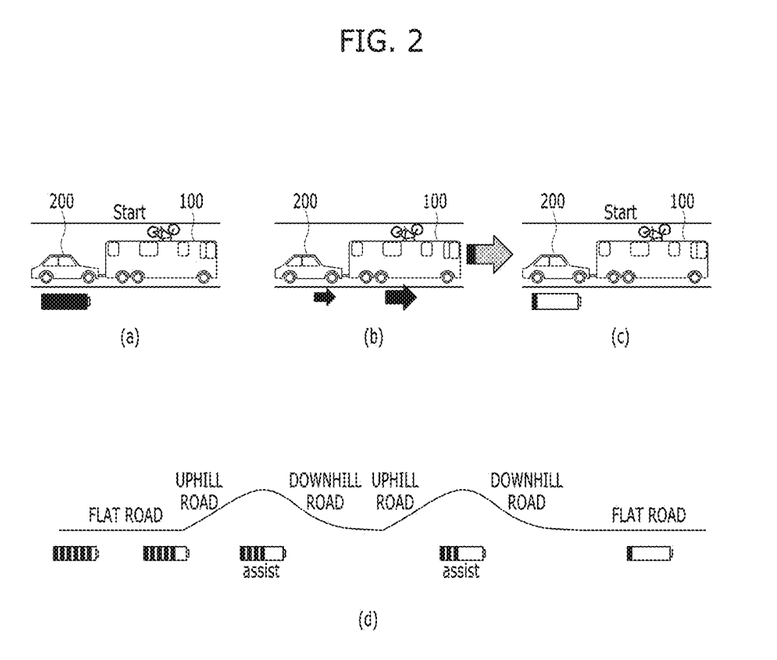
FIG. 2 shows views illustrating a towing vehicle and a towed vehicle controlled by a power assisted towing mode function for ecofriendly vehicles in accordance with one embodiment of the present invention.

FIG. 2 shows views (a), (b), (c) and (d) illustrating a towing vehicle 100 and a towed vehicle 200 controlled by a power assisted towing mode function for ecofriendly vehicles in accordance with one embodiment of the present invention.

Referring to views (a) to (c) of FIG. 2, if the towed vehicle 200 is an ecofriendly vehicle, a state of charge (SOC) of the towed vehicle 200 at a towing start point may have a value exceeding a threshold value.

Thereafter, if a power assisted towing mode is executed, the towed vehicle 200 may calculate assistant power to assist power of the towing vehicle 100 according to discharge limit power conditions of an energy storage system (ESS) based on an accelerator pedal amount of the towing vehicle 100, and output the calculated assistant power through a motor of the towed vehicle 200. Thereby, towing force of the towing vehicle 100 is decreased and, thus, a fuel consumption amount of the towing vehicle 100 may be decreased.

Thereby, when the towed vehicle 200 reaches a destination, energy stored in the ESS is consumed according to driving of the motor and, thus, the SOC of the towed vehicle 200 may have the threshold value or less.

Referring to view (d) of FIG. 2, a driving path of the towing vehicle 100 may include flat sections, uphill sections, downhill sections, etc. Here, the motor of the towed vehicle 200 is operated according to the power assisted towing mode in the flat sections and the uphill sections. In the uphill sections, the towing force of the towing vehicle 100 may be increased and the energy consumption amount of the ESS may be increased. Therefore, as the towed vehicle 200 gets closer to the destination, the SOC of the ESS may be lowered.

Figure 3:
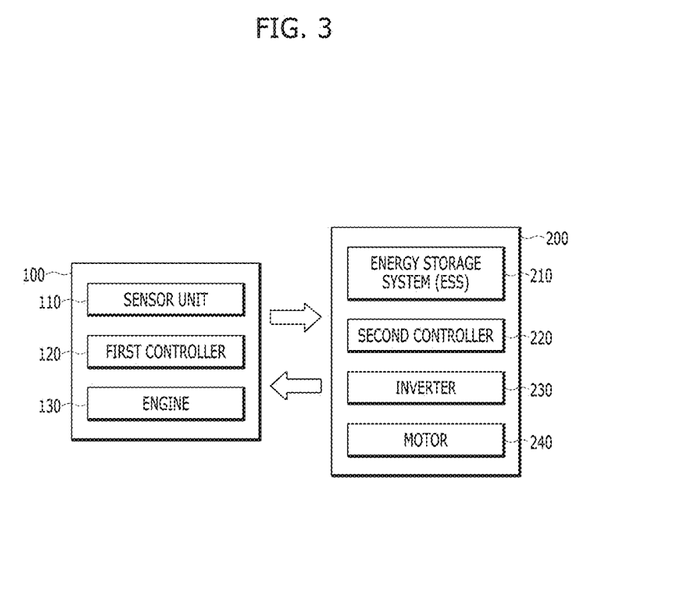
FIG. 3 is a block diagram of a power assisted towing mode control system for ecofriendly vehicles in accordance with one embodiment of the present invention.

FIG. 3 is a block diagram of a power assisted towing mode control system for ecofriendly vehicles in accordance with one embodiment of the present invention.

Referring to FIG. 3, the power assisted towing mode control system for ecofriendly vehicles may include a first vehicle 100 as a towing vehicle and a second vehicle 200 as a towed vehicle.

The first vehicle 100 may include a sensor unit 110, a first controller 120 and an engine 130.

The sensor unit 110 may monitor an accelerator pedal amount according to operation of an accelerator pedal by a driver. The sensor unit 110 may include an accelerator position sensor (APS).

The first controller 120 may determine the accelerator pedal amount received from the sensor unit 110. The first controller 120 may calculate driver request torque based on the accelerator pedal amount.

For example, the first controller 120 may determine whether or not the accelerator pedal amount exceeds 0. When the accelerator pedal amount exceeds 1, the first controller 120 may determine that the driver intends to accelerate, and thus calculate the driver request torque.

Thereafter, the first controller 120 may calculate motor allowable torque based on the driver request torque. For this purpose, the first controller 120 may calculate the motor allowable torque by assigning a remaining torque value except a minimum engine torque value considering efficiency of the engine 130 based on the driver request torque.

The first controller 120 may transmit the motor allowable torque to the second vehicle 200 and receive motor dischargeable torque corresponding thereto. Thereafter, the first controller 120 may calculate engine final output torque based on the received motor dischargeable torque. For this purpose, the first controller 120 may set the engine final output torque to a difference value between the driver request torque and the motor dischargeable torque.

If motor torque output is decreased according to lowering of the SOC of an energy storage system (ESS) 210 of the second vehicle 200, the first controller 120 may control engine torque output to compensate for decrease in the motor torque output. Here, the first controller 120 may add the same value as a motor torque output decrement to the engine output torque.

The first controller 120 may include an engine management system (EMS) to control the torque of the engine 130.

The engine 130 may output engine torque based on the engine final output torque received from the first controller 120. For example, the engine 130 may be controlled by the EMS.

The second vehicle 200 may include the ESS 210, a second controller 220, an inverter 230 and a motor 240.

The ESS 210 may be an energy storage device of the second vehicle 200. The ESS 210 may include a battery to drive the motor 240 of the second vehicle 200.

The second controller 220 may include a hybrid control unit (HCU) to control the overall operation of a hybrid vehicle, a motor control unit (MCU) to control the operation of the motor 240, and a battery control unit (BCU) to control and manage the battery. The BCU may be referred to as a battery management system (BMS).

The second controller 220 may receive the accelerator pedal amount from the towed vehicle 200 and determine discharge limit power of the ESS 210. For this purpose, the second controller 220 may measure the SOC of the ESS 210 and determine whether or not the SOC of the ESS 210 is a threshold value or less.

Thereafter, if the discharge limit power exceeds the threshold value, the second controller 220 may receive the motor allowable torque and calculate the motor dischargeable torque based on the motor allowable torque. Here, the second controller 220 may set the motor dischargeable torque to a value within the discharge limit power of the ESS 210 and the motor allowable torque.

For example, the second controller 220 may determine whether or not the discharge limit power of the ESS 210 exceeds 0. The second controller 220 may calculate the motor dischargeable torque, when the discharge limit power of the ESS 210 exceeds 0.

Thereafter, the second controller 220 may control the motor 240 to output motor torque based on the motor dischargeable torque. For this purpose, the second controller 220 may transmit the motor dischargeable torque to the inverter 230.

The inverter 230 may calculate current control based on the motor dischargeable torque received from the second controller 220. Thereafter, the inverter 230 may control the motor 240 to output the motor torque based on the calculated current control.

The motor 240 may output the motor torque based on the current control received from the inverter 230.

Figure 4:
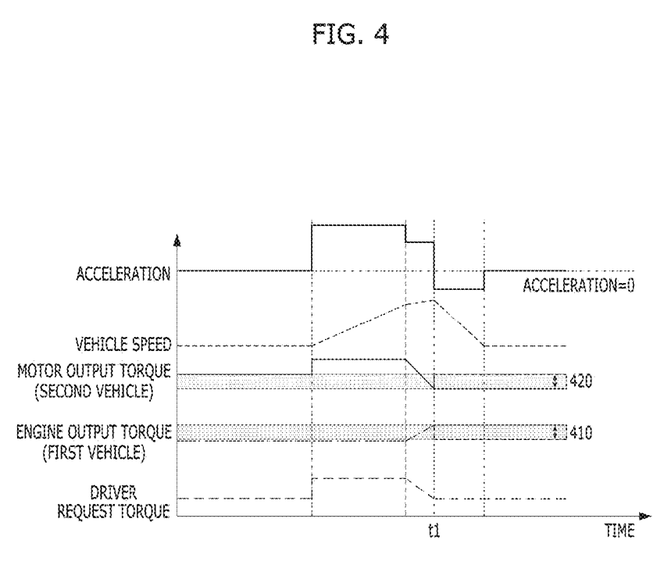
FIG. 4 is a graph representing a motor torque output decrement according to torque control in a power assisted towing mode in accordance with one embodiment of the present invention.

FIG. 4 is a graph representing a motor torque output decrement according to torque control in the power assisted towing mode in accordance with one embodiment of the present invention.

Referring to FIG. 4, the X-axis of the graph shown in FIG. 4 represents time, and the Y-axis represents acceleration, vehicle speed, motor output torque of the towed vehicle 200, engine output torque of the towing vehicle 100 and driver request torque of the towing vehicle 100.

In more detail, the graph represents change in the motor output torque and change in the engine output torque before and after a point in time t1 of compensating for a motor torque output decrement according to lowering of the SOC of the ESS 210.

The vehicle speed is increased until the point in time t1 of compensating for the motor torque output decrement according to lowering of the SOC of the ESS 210 and is then decreased, the acceleration has a value of zero to a negative value, and the driver request torque is decreased until the point in time t1 of compensating for the motor torque output decrement t1 and then has a constant value.

Here, if the SOC of the ESS 210 of the towed vehicle 200 is lowered to the threshold value or less, the motor output torque of the towed vehicle 200 may be decreased before the point in time t1 of compensating for the motor torque output decrement and then have a constant value after the point in time t1 of compensating for the motor torque output decrement.

Therefore, the engine output torque of the towing vehicle 100 may be increased before the point in time t1 of compensating for the motor torque output decrement and then have a constant value after the point in time t1 of compensating for the motor torque output decrement.

Here, an increment of the engine output torque may have the same value as a decrement of the motor output torque. For example, a motor torque output decrement compensation value 410 of the engine output torque according to lowering of the SOC of the ESS 210 may have the same value as a decrement 420 of the motor output torque according to lowering of the SOC of the ESS 210.

Figure 5:
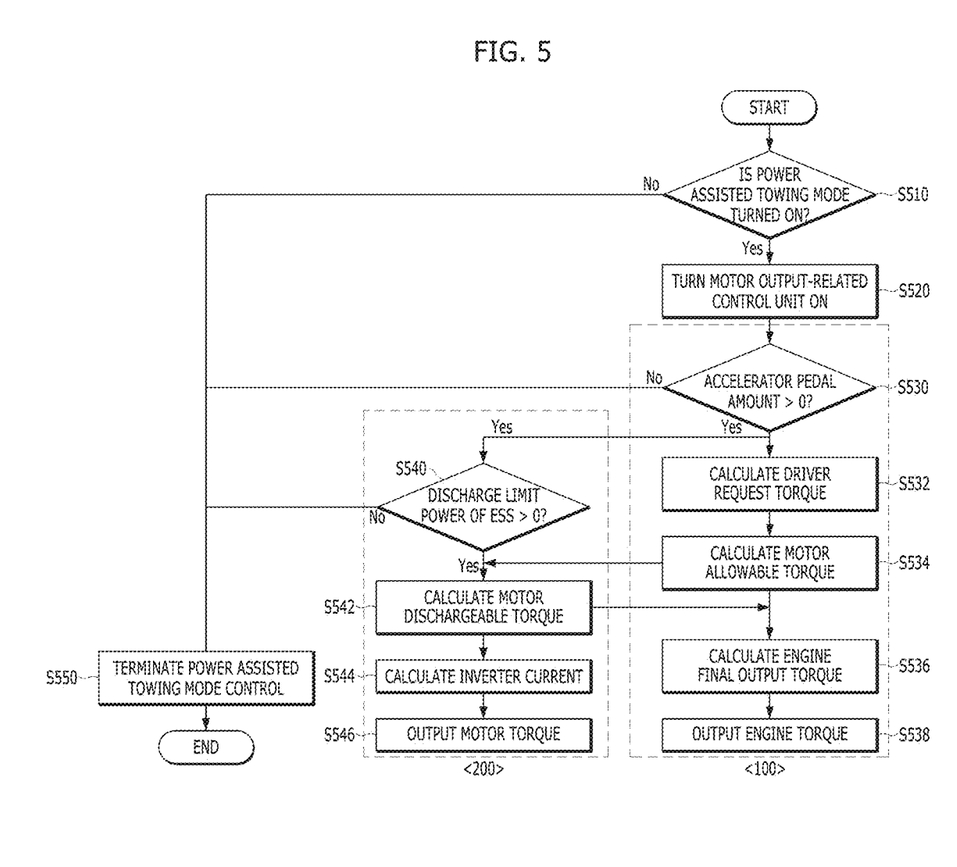
FIG. 5 is a flowchart illustrating a power assisted towing mode control method for ecofriendly vehicles in accordance with one embodiment of the present invention.

FIG. 5 is a flowchart illustrating a power assisted towing mode control method for ecofriendly vehicles in accordance with one embodiment of the present invention.

Referring to FIG. 5, whether or not a power assisted towing mode function of the second vehicle 200 is turned on may be determined (Operation S510). Here, if it is determined that the power assisted towing mode function of the second vehicle 200 is not turned on, control of the power assisted towing mode may be terminated (Operation S550).

After Operation S510, a motor output-related control unit of the second vehicle 200 may be turned on (Operation S520).

After Operation S520, the first vehicle 100 may receive an accelerator pedal amount and determine whether or not the accelerator pedal amount exceeds 0 (Operation S530). Here, if the accelerator pedal amount of the first vehicle 100 does not exceed 0, control of the power assisted towing mode may be terminated (Operation S550).

After Operation S530, if the accelerator pedal amount exceeds 0, the first vehicle 100 may calculate driver request torque (Operation S532).

After Operation S532, the first vehicle 100 may calculate motor allowable torque corresponding to the driver request torque (Operation S534).

After Operation S530, if the accelerator pedal amount exceeds 0, the second vehicle 200 may determine whether or not discharge limit power of the ESS 210 of the second vehicle 200 exceeds 0 (Operation S540). Here, if the discharge limit power of the ESS 210 of the second vehicle 200 does not exceed 0, control of the power assisted towing mode may be terminated (Operation S550).

After operation S540, if the discharge limit power of the ESS 210 of the second vehicle 200 exceeds 0, the second vehicle 200 may calculate motor dischargeable torque based on the motor allowable torque calculated by the first vehicle 100 (Operation S542).

After Operation S542, the second vehicle 200 may calculate current required by the inverter 230 to control the motor 240 based on the motor dischargeable torque (Operation S544).

After Operation S544, the second vehicle 200 may output motor torque based on current control of the inverter 230.

After Operations S534 and S542, the first vehicle 100 may calculate engine final output torque based on the motor dischargeable torque received from the second vehicle 200 (Operation S536).

After Operation S536, the first vehicle 100 may output engine torque corresponding to the calculated engine final output torque (Operation S538).

In embodiments, a method of towing an ecofriendly vehicle. A towing vehicle tows a towed vehicle which is the ecofriendly vehicle. The towing vehicle and the towed vehicle are capable of communicating with each other. During towing the towed vehicle, the towing vehicle and the towed vehicle operates in a torque assisted towing mode, in which the towed vehicle provides assist torque to assist the towing vehicle.

In one embodiment, one or more controllers of the towing vehicle determine whether or not an accelerator pedal amount exceeds a threshold amount value. When determined that the accelerator pedal amount of the towing vehicle exceeds a threshold amount value, the one or more controllers of the towing vehicle calculate it's a minimum engine torque value, and further calculate a desired assist torque value (or a motor allowable torque value) which is a difference value between the minimum engine torque value and a towing torque (or driver request torque) required in response to the acceleration pedal amount. The one or more controllers of the towing vehicle send a request for the desired assistor torque to the towed vehicle.

Upon receipt of the request from the towing vehicle, one or more controllers of the towed vehicle determine whether a current discharge power limit (or discharge limit power) of an energy storage system of the towed vehicle exceeds a threshold power value. When determined that the current discharge power limit is greater than the threshold power value, the one or more controllers of the towed vehicle calculate an actual assist torque value based on the current discharge power limit and the desired assist torque value, and send a reply including information regarding the actual assist torque to the towing vehicle or the controller of the towed vehicle. In one embodiment, the actual torque value does not cause the discharge power to exceed the discharge power limit, and does not exceed the desired assist torque value. The one or more controllers of the towed vehicle cause a motor of the towed vehicle to operate to produce the actual assist torque.

Upon receipt of information regarding the calculated actual assist torque value, the one or more controllers of the towing vehicle calculate an additional engine torque based on the minimum engine torque value and the actual assist torque value. The one or more controllers of the towing vehicle cause the engine or motor of the towing vehicle produce an actual towing torque which is, e.g., sum of the minimum engine torque and the additional engine torque.

In embodiments, the towing torque includes one or more controllers configured to: determine whether or not an accelerator pedal amount exceeds a threshold amount value, when determined that the accelerator pedal amount of the towing vehicle exceeds a threshold amount value; calculate it's a minimum engine torque value, and a desired assist torque value which is difference between the minimum engine torque value and a towing torque in response to the acceleration pedal amount; send a request for the desired assistor torque to the towed vehicle; upon receipt of information regarding the calculated actual assist torque value, calculate an additional engine torque based on the minimum engine torque and the actual assist torque; and cause the engine or motor of the towing vehicle produce an actual towing torque which is, e.g., sum of the minimum engine torque and the additional engine torque.

In embodiments, the towed vehicle comprises one or more controllers that are configured to: communicate with the one or more controllers of the towing vehicle; receive a request from the towing vehicle of the desired assist torque; determine whether a current discharge power limit (or discharge limit power) of an energy storage system of the towed vehicle exceeds a threshold power value; when determined that the current discharge power limit is greater than the threshold power value, calculate an actual assist torque value based on the current discharge power limit and the desired assist torque value; send a reply including information of the actual assist torque value to the towing vehicle or the controller of the towed vehicle; and cause a motor of the towed vehicle to operate to produce the calculated actual assist torque.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The above-described method in accordance with one embodiment may be recorded as a program which may be executed in computers and be stored in a computer readable recording medium and, for example, computer readable recording media may include a ROM, a RAM, a CD-ROM, a magnetic tape, a floppy disk, an optical data storage device, etc. The computer readable recording media may be distributed to computer systems connected by a network and, herein, computer readable code may be stored and executed in a distributed manner. Further, functional programs, code and code segments to implement the above-described method may be easily deduced by programmers in the art to which the embodiments pertain.

As is apparent from the above description, effects of a power assisted towing mode control method and system for ecofriendly vehicles in accordance with the present invention will be described below.

First, fuel consumption of a towing vehicle is reduced by power assistance of a towed vehicle during movement and, thus, fuel efficiency effects may be raised.

Second, power of the towing vehicle is assisted using electric energy stored in the towed vehicle, i.e., an ecofriendly vehicle, when a towing mode is executed, and, thus, productivity of the towing vehicle may be enhanced due to improvement in fuel efficiency and improvement in output of the towing vehicle.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of towing an ecofriendly vehicle, wherein a first vehicle as a towing vehicle tows a second vehicle as a towed vehicle that is an ecofriendly vehicle and capable of communicating with the first vehicle, the method comprising:
   determining, by the first vehicle, whether or not an accelerator pedal amount exceeds a threshold amount value;
   calculating, by the first vehicle, a driver request torque based on the accelerator pedal amount;
   calculating, by the first vehicle, motor allowable torque based on the driver request torque, wherein calculating the motor allowable torque comprises assigning a remaining torque value, excluding a minimum engine torque value that is based on efficiency of an engine of the first vehicle, from the driver request torque as the motor allowable torque;
   receiving, by the second vehicle, the motor allowable torque;
   calculating, by the second vehicle, motor dischargeable torque based on the motor allowable torque; and
   performing, by the second vehicle, motor torque output based on the motor dischargeable torque.

2. A method of towing an ecofriendly vehicle, wherein a first vehicle as a towing vehicle tows a second vehicle as a towed vehicle that is an ecofriendly vehicle and capable of communicating with the first vehicle, the method comprising:
   determining, by the first vehicle, that an accelerator pedal amount exceeds a threshold amount value;
   calculating, by the first vehicle, a driver request torque based on the accelerator pedal amount;
   calculating, by the first vehicle, motor allowable torque based on the driver request torque, wherein calculating the motor allowable torque comprises assigning a remaining torque value, excluding a minimum engine torque value that is based on efficiency of an engine of the first vehicle, from the driver request torque as the motor allowable torque;
   receiving, by the second vehicle, the motor allowable torque and calculating motor dischargeable torque based on the motor allowable torque;
   performing, by the second vehicle, motor torque output based on the motor dischargeable torque; and
   determining, by the second vehicle, if a discharge limit power of an energy storage system exceeds a threshold power value.

3. The method according to claim 2, wherein calculating the motor dischargeable torque comprises setting the motor dischargeable torque to a value within the discharge limit power of the energy storage system and the motor allowable torque.

4. The method according to claim 1, further comprising calculating, by the first vehicle, engine final output torque based on the motor dischargeable torque received from the second vehicle.

5. The method according to claim 4, wherein calculating the engine final output torque comprises setting the engine final output torque to a difference value between the driver request torque and the motor dischargeable torque.

6. The method according to claim 1, wherein performing the motor torque output comprises:
   calculating, by a controller of the second vehicle, current for driving a motor of the second vehicle based on the motor dischargeable torque; and
   operating the motor of the second vehicle to output torque based on the calculated current control.

7. The method according to claim 1, wherein calculating the motor dischargeable torque comprises calculating the motor dischargeable torque so that a distance between the first vehicle and the second vehicle remains constant.

8. The method according to claim 1, further comprising controlling, by the first vehicle, engine torque output to compensate for a decrement of the motor torque output when the motor torque output is decreased as a state of charge (SOC) of an energy storage system of the second vehicle decreases.

9. A computer readable recording medium having a program recorded therein to implement the method according to claim 1.

10. A power assisted towing mode control system comprising:
    a first vehicle as a towing vehicle; and
    a second vehicle as a towed vehicle, the second vehicle being an ecofriendly vehicle;
    wherein the first vehicle is configured to:
       determine whether or not an accelerator pedal amount exceeds a threshold value;
       calculate a driver request torque based on the accelerator pedal amount; and
       calculate motor allowable torque by assigning a remaining torque value, excluding a minimum engine torque value that is based on efficiency of an engine of the first vehicle, from the driver request torque as the motor allowable torque; and
    wherein the second vehicle is configured to:
       receive the motor allowable torque and calculates motor dischargeable torque based on the motor allowable torque; and
       perform motor torque output based on the motor dischargeable torque.

11. The power assisted towing mode control system according to claim 10, wherein the second vehicle comprises an energy storage system and is configured to determine discharge limit power of the energy storage system when the accelerator pedal amount of the first vehicle exceeds the threshold value.

12. The power assisted towing mode control system according to claim 11, wherein the second vehicle is configured to set the motor dischargeable torque to a value within the determined discharge limit power of the energy storage system and the motor allowable torque.

13. The power assisted towing mode control system according to claim 10, wherein the first vehicle is configured to calculate engine final output torque based on the motor dischargeable torque received from the second vehicle.

14. The power assisted towing mode control system according to claim 13, wherein the first vehicle is configured to set the engine final output torque to a difference value between the driver request torque and the motor dischargeable torque.

15. The power assisted towing mode control system according to claim 10, wherein:

the second vehicle comprises an inverter configured to calculate current control according to the motor dischargeable torque; and a motor of the second vehicle is configured to output torque based on the calculated current control.

16. The power assisted towing mode control system according to claim 10, wherein the second vehicle is configured to calculate the motor dischargeable torque so that a distance between the first vehicle and the second vehicle remains constant.

17. The power assisted towing mode control system according to claim 10, wherein the first vehicle is configured to control engine torque output to compensate for a decrement of the motor torque output when the motor torque output is decreased according to lowering of a state of charge (SOC) of an energy storage system of the second vehicle.

18. The method according to claim 2, further comprising calculating, by the first vehicle, engine final output torque based on the motor dischargeable torque received from the second vehicle.

19. The method according to claim 2, wherein performing the motor torque output comprises:

calculating, by a controller of the second vehicle, current for driving a motor of the second vehicle based on the motor dischargeable torque; and operating the motor of the second vehicle to output torque based on the calculated current control.

20. The method according to claim 2, wherein calculating the motor dischargeable torque comprises calculating the motor dischargeable torque so that a distance between the first vehicle and the second vehicle remains constant.

\* \* \* \* \*